(12) United States Patent
Eguchi

(10) Patent No.: US 11,754,872 B2
(45) Date of Patent: Sep. 12, 2023

(54) ELECTRO-OPTICAL DEVICE AND ELECTRONIC APPARATUS

(71) Applicant: SEIKO EPSON CORPORATION, Tokyo (JP)

(72) Inventor: Yoshikazu Eguchi, Fujimi-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/696,844

(22) Filed: Mar. 16, 2022

(65) Prior Publication Data

US 2022/0299818 A1 Sep. 22, 2022

(30) Foreign Application Priority Data

Mar. 17, 2021 (JP) ................................. 2021-043198

(51) Int. Cl.
*G02F 1/1335* (2006.01)
*G02F 1/13363* (2006.01)

(52) U.S. Cl.
CPC .... *G02F 1/133512* (2013.01); *G02F 1/13363* (2013.01); *G02F 1/133526* (2013.01)

(58) Field of Classification Search
CPC ......... G02F 1/133512; G02F 1/133526; G02F 1/13363
See application file for complete search history.

(56) References Cited

U.S. PATENT DOCUMENTS

| 10,942,388 B1* | 3/2021 | Haruyama ........ G02F 1/133512 |
| 2015/0041833 A1 | 2/2015 | Nimura |
| 2016/0109752 A1* | 4/2016 | Tateno ................. G02B 3/0068 349/110 |
| 2018/0364512 A1 | 12/2018 | Tsuchiya |
| 2020/0133086 A1* | 4/2020 | Ito ......................... G02F 1/1368 |

FOREIGN PATENT DOCUMENTS

| JP | 2015034860 | 2/2015 |
| JP | 2019003159 | 1/2019 |

* cited by examiner

*Primary Examiner* — Edward J Glick
*Assistant Examiner* — David Y Chung
(74) *Attorney, Agent, or Firm* — JCIPRNET

(57) ABSTRACT

An electro-optical device includes a first substrate, a second substrate, a liquid crystal layer, a pixel electrode, a light shielding portion, a lens being arranged between the light shielding portion and the pixel electrode and overlapping with the pixel electrode in plan view, and a phase difference compensation member arranged on an incident side of the light with respect to the liquid crystal layer and compensating a phase difference of the light in the liquid crystal layer. In a display region, a light shielding member having a light shielding property is provided between the liquid crystal layer and the phase difference compensation member. The lens includes a first layer arranged on a side of the light shielding portion and a second layer being arranged on a side of the pixel electrode and having a refractive index different from that of the first layer.

13 Claims, 10 Drawing Sheets

ELECTRO-OPTICAL DEVICE AND ELECTRONIC APPARATUS

The present application is based on, and claims priority from JP Application Serial Number 2021-043198, filed Mar. 17, 2021, the disclosure of which is hereby incorporated by reference herein in its entirety.

BACKGROUND

1. Technical Field

The present disclosure relates to an electro-optical device and an electronic apparatus.

2. Related Art

An electronic apparatus such as a projector uses an electro-optical device such as a liquid crystal device capable of changing optical characteristics for each pixel. For example, the liquid crystal device includes a counter substrate, an element substrate, and a liquid crystal layer interposed between those substrates.

A counter substrate included in a liquid crystal device described in JP-A-2019-3159 includes a lens layer and a phase difference compensation layer. When the lens layer is provided, light can be condensed. When the phase difference compensation layer is provided, a phase difference of light generated in a liquid crystal layer is compensated.

Further, an element substrate included in a liquid crystal device described in JP-A-2015-34860 includes a thin film transistor (TFT) and a micro lens being one layer arranged between the TFT and a liquid crystal layer. Further, a light shielding layer is provided to each of a counter substrate and the element substrate included in the liquid crystal device described in JP-A-2015-34860. The light shielding layer is arranged in a display region that contributes to display of an image.

As described above, in the liquid crystal device in JP-A-2019-3159, the lens layer is provided to the counter substrate. In this configuration, when light enters the liquid crystal device through the counter substrate, light is condensed by the lens layer in the liquid crystal layer. Thus, there is a risk in that part of the liquid crystal layer may be deteriorated. As a result, there is a risk in that light-fast duration is shortened.

Further, as described above, in the liquid crystal device in JP-A-2015-34860, the light shielding layer is provided to the counter substrate. In this configuration, when light enters the liquid crystal device through the counter substrate, light is dispersed or diffracted by the light shielding layer of the counter substrate. As a result, there is a risk in that contrast may be degraded.

Further, as described above, in the liquid crystal device in JP-A-2015-34860, the micro-lens being one layer is provided between the TFT and the liquid crystal layer. However, when the micro-lens being only one layer is provided, lens power is not sufficient. Thus, there is a risk in that an image displayed by the liquid crystal device may be dark.

SUMMARY

An electro-optical device according to one aspect of the present disclosure includes a first substrate, a second substrate, and a liquid crystal layer arranged between the first substrate and the second substrate. Light enters the electro-optical device through the second substrate, and is emitted through the first substrate. The electro-optical device includes a pixel electrode arranged between the liquid crystal layer and the first substrate, a light shielding portion arranged between the pixel electrode and the first substrate, a lens being arranged between the light shielding portion and the pixel electrode and overlapping with the pixel electrode in plan view, and a phase difference compensation member arranged on an incident side of the light with respect to the liquid crystal layer and compensating a phase difference of the light in the liquid crystal layer. In a display region, a light shielding member having a light shielding property is provided between the liquid crystal layer and the phase difference compensation member. The lens includes a first layer arranged on a side of the light shielding portion and a second layer being arranged on a side of the pixel electrode and having a refractive index different from that of the first layer.

An electronic apparatus according to one aspect of the present disclosure includes the above-mentioned electro-optical device and a control unit that controls the electro-optical device.

DESCRIPTION OF EXEMPLARY EMBODIMENTS

Figure 1:
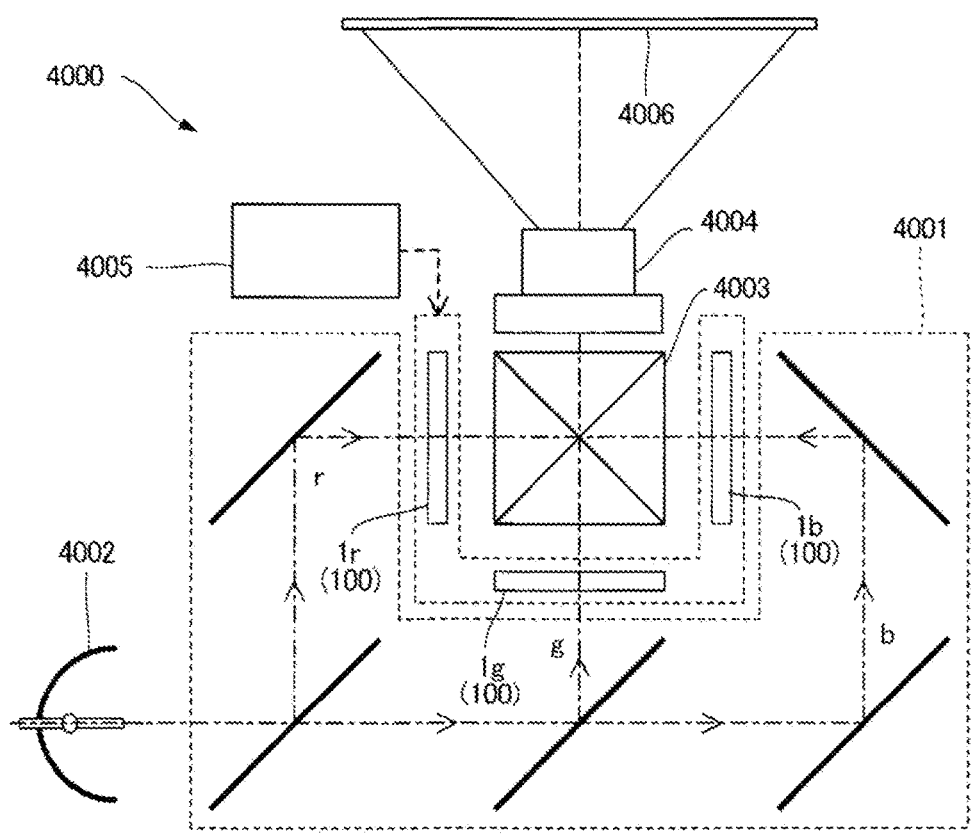
FIG. 1 is a schematic diagram illustrating a projection-type display apparatus as an example of an electronic apparatus.

Preferred exemplary embodiments of the present disclosure are described below with reference to the accompanying drawings. Note that, in the drawings, dimensions and scales of sections are different from actual dimensions and scales as appropriate, and some of the sections are schematically illustrated for easy understanding. Further, the scope of the present disclosure is not limited to these exemplary embodiments unless otherwise stated to limit the present disclosure in the following descriptions.

1. Projection-Type Display Apparatus

FIG. 1 is a schematic diagram illustrating a projection-type display apparatus 4000 as an example of an electronic apparatus. The projection-type display apparatus 4000 illustrated in FIG. 1 is a three-plate type projector, for example. The projection-type display apparatus 4000 includes electro-optical devices 1r, 1g, and 1b, a control unit 4005, an illumination optical system 4001, an illumination device 4002, a photosynthetic element 4003, and a projection optical system 4004.

The electro-optical device 1r is an electro-optical device 100 corresponding to a red display color, the electro-optical device 1g is an electro-optical device 100 corresponding to a green display color, and the electro-optical device 1b is an electro-optical device 100 corresponding to a blue display color. Specifically, the projection-type display apparatus 4000 includes the three electro-optical devices 1r, 1g, and 1b that correspond to display colors of red, green, and blue, respectively. Further, for example, the control unit 4005 includes a processor and a memory, and controls an operation of the electro-optical device 100.

The illumination optical system 4001 supplies a red color component r of light emitted from the illumination device 4002 as a light source to the electro-optical device 1r, a green color component g of the light to the electro-optical device 1g, and a blue color component b of the light to the electro-optical device 1b. Each of the electro-optical devices 1r, 1g, and 1b functions as an optical modulator, such as a light bulb, that modulates respective rays of the monochromatic light supplied from the illumination optical system 4001 depending on display images.

The photosynthetic element 4003 combines the rays of the light emitted from each of the electro-optical devices 1r, 1g, and 1b. The photosynthetic element 4003 includes a dichroic prism. The dichroic prism includes two dichroic films arranged perpendicularly to each other. Further, for example, the projection optical system 4004 includes a projection lens. The projection optical system 4004 projects light synthesized by the photosynthetic element 4003 to a projection surface 4006. In this manner, a full color image can be obtained on the projection surface 4006.

The projection-type display apparatus 4000 described above includes the electro-optical device 100 and the control unit 4005 that controls the electro-optical device 100 as described later. The electro-optical device 100 described later is used, and thus degradation of display quality is suppressed. Therefore, the electro-optical device 100 is provided, and thus display quality of the projection-type display apparatus 4000 can be improved.

2. Electro-Optical Device

2A. First Exemplary Embodiment

2Aa. Basic Configuration

Figure 2:
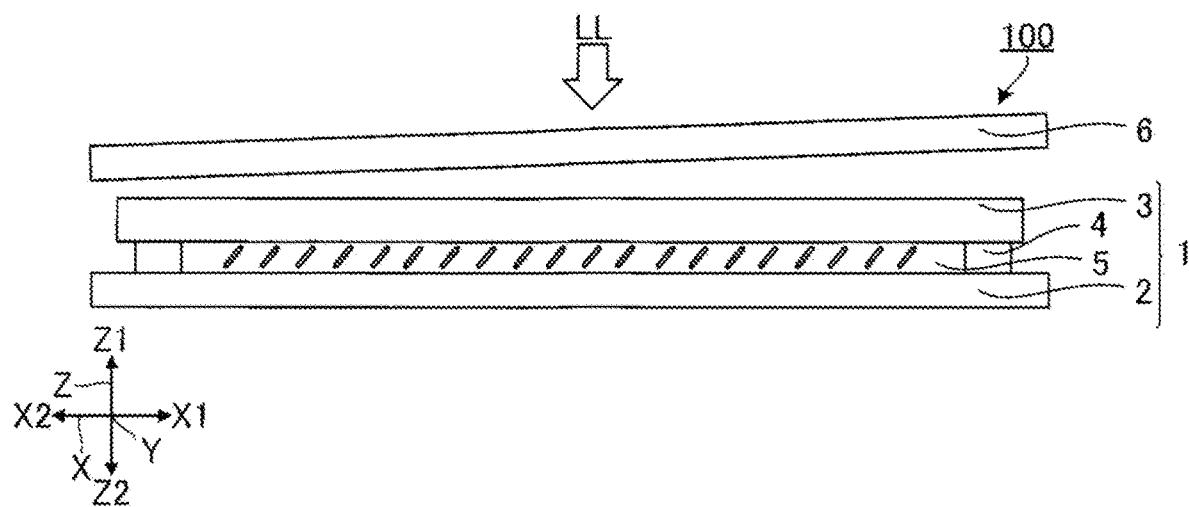
FIG. 2 is a cross-sectional view illustrating a schematic configuration of an electro-optical device according to a first exemplary embodiment.
Figure 3:
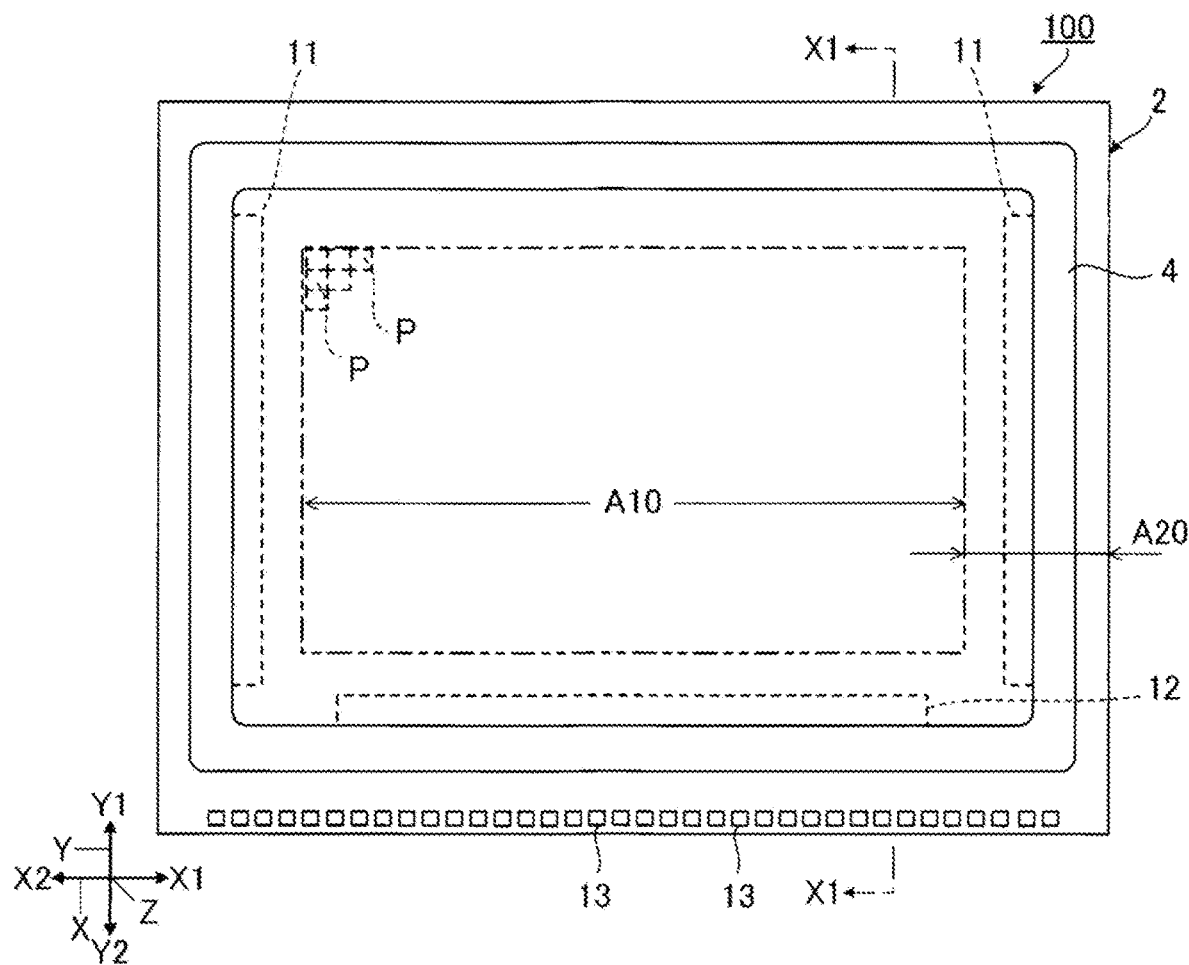
FIG. 3 is a plan view illustrating a counter substrate and a sealing member in FIG. 2.

FIG. 2 is a cross-sectional view illustrating a schematic configuration of the electro-optical device 100 according to the first exemplary embodiment. FIG. 3 is a plan view illustrating a counter substrate 3 and a sealing member 4 in FIG. 2. Note that FIG. 2 corresponds to a cross section of FIG. 3 taken along the line X1-X1. Note that, for convenience of description, the description is made appropriately using an X axis, a Y axis, and a Z axis orthogonal to one another. Further, one direction along the X axis is denoted with an X1 direction, and a direction opposite to the X1 direction is denoted with an X2 direction. Similarly, one direction along the Y axis is denoted with a Y1 direction, and a direction opposite to the Y1 direction is denoted with a Y2 direction. One direction along the Z axis is denoted with a Z1 direction, and a direction opposite to the Z1 direction is denoted with a Z2 direction. Further, in the following description, a view in the Z1 direction or the Z2 direction is referred to as "plan view".

The electro-optical device 100 illustrated in FIG. 2 is a transmission-type liquid crystal device employing an active matrix driving system. The electro-optical device 100 according to the present exemplary embodiment is a liquid crystal device of a Vertical Alignment (VA) mode.

The electro-optical device 100 includes a display panel 1 and a phase difference compensation plate 6. The display panel 1 includes an element substrate 2 having a transmissive property, the counter substrate 3 having a transmissive property, the sealing member 4, and a liquid crystal layer 5. The element substrate 2, the liquid crystal layer 5, the counter substrate 3, and the phase difference compensation plate 6 are aligned in the Z1 direction in the stated order. In the following description, "transmissive property" refers to transparency to visible light, and indicates that a transmittance of visible light is equal to or greater than 50%. Further, the shape of the electro-optical device 100 in plan view is a rectangular shape, but may be a circular shape, for example.

In the present exemplary embodiment, light LL emitted from the illumination device 4002 in FIG. 1 enters the display panel 1 through the counter substrate 3 as illustrated in FIG. 2. After that, the light LL passes through the liquid crystal layer 5, and is emitted through the element substrate 2. In the display panel 1, the light entering the counter substrate 3 is modulated before being emitted through the element substrate 2. With this, an image is displayed.

The element substrate 2 is a substrate including a plurality of Thin Film Transistors (TFT) described later. As illustrated in FIG. 3, on the element substrate 2, a plurality of scanning line drive circuits 11, a signal line driving circuit 12, and a plurality of external terminals 13. The plurality of external terminals 13 are connected to wiring lines (not illustrated) drawn from the scanning line drive circuits 11 or the signal line driving circuit 12.

The counter substrate 3 is a substrate arranged to face the element substrate 2. The sealing member 4 is arranged between the element substrate 2 and the counter substrate 3. The sealing member 4 is a member having a frame-like shape. The sealing member 4 is formed using an adhesive containing various types of curable resins such as an epoxy resin. The sealing member 4 includes a gap material formed of an inorganic material such as glass so as to control a distance between the element substrate 2 and the counter substrate 3. Note that the distance between the element substrate 2 and the counter substrate 3 may be controlled by arranging a spacer being an independent member from the sealing member 4.

The liquid crystal layer 5 is arranged in a region surrounded by the element substrate 2, the counter substrate 3, and the sealing member 4. The liquid crystal layer 5 is an electro-optical layer that is arranged between the element substrate 2 and the counter substrate 3 and changes its optical characteristics depending on an electric field. The liquid crystal layer 5 contains liquid crystal molecules having negative dielectric anisotropy. The alignment of the liquid crystal molecules changes depending on a voltage applied to the liquid crystal layer 5.

The phase difference compensation plate 6 is arranged on a side opposite to the element substrate 2 with respect to the liquid crystal layer 5, that is, an incident side of the light LL. In the example illustrated in FIG. 2, the phase difference compensation plate 6 is arranged in the Z1 direction with respect to the display panel 1. The phase difference compensation plate 6 compensates a phase difference in the liquid crystal layer 5. The phase difference compensation plate 6 has a plate-like shape, and is inclined with respect to an optical axis of the light LL. The plate surface of the phase difference compensation plate 6 is inclined obliquely with respect to the optical axis of the light LL, and thus the above-mentioned phase difference can be compensated more effectively as compared to a case in which the plate surface is perpendicular to the optical axis. Note that the plate surface of the phase difference compensation plate 6 may be perpendicular to the optical axis.

As illustrated in FIG. 3, the electro-optical device 100 includes a display region A10 and a peripheral region A20. The peripheral region A20 is placed on an outer side of the display region A10 in plan view. The display region A10 is a region in which an image is displayed. The display region A10 is provided with a plurality of pixels P arranged in a matrix pattern. The peripheral region A20 is a region having a frame-like shape surrounding the display region A10 in plan view. In the peripheral region A20, the scanning line drive circuits 11 and the signal line driving circuit 12 are arranged.

The electro-optical device 100 of this kind is applied to a projection-type projector described above, for example. In this case, the electro-optical device 100 functions as an optical modulator such as a light bulb. Further, for example, the electro-optical device 100 is applied to a display device, such as a personal computer and a smart phone, that performs color display as described later. When being applied to the display device, a color filter is used with respect to the electro-optical device 100 as appropriate.

2Ab. Electrical Configuration of Element Substrate 2

Figure 4:
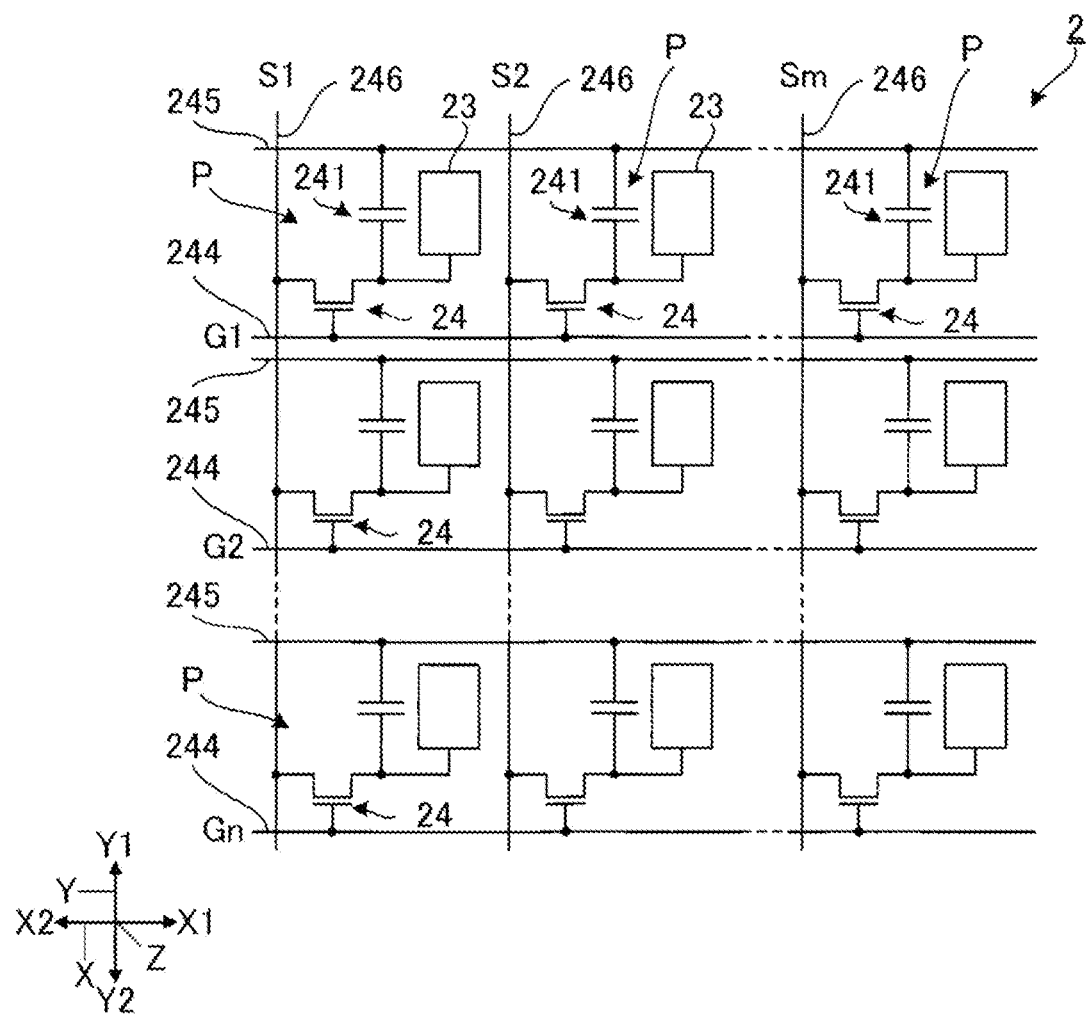
FIG. 4 is an equivalent circuit diagram illustrating an electrical configuration of an element substrate in FIG. 2.

FIG. 4 is an equivalent circuit diagram illustrating an electrical configuration of the element substrate 2 in FIG. 2. As illustrated in FIG. 4, the element substrate 2 includes a plurality of transistors 24, a plurality of pixel electrodes 23, n pieces of scanning lines 244, m pieces of signal lines 246, and n pieces of constant potential lines 245. The plurality of pixel electrodes 23 are given as an example of a "plurality of electrodes". Each of n and m is an integer of 2 or greater.

The transistor 24 and the pixel electrode 23 are provided for each of the pixels P. For example, each of the transistors 24 is a TFT functioning as a switching element. Each of the transistors 24 includes a gate, a source, and a drain. Each of the pixel electrodes 23 is electrically connected to the drain of the corresponding transistor 24.

Each of the n pieces of scanning lines 244 extends in the X1 direction, and the n pieces of scanning lines 244 are aligned in the Y2 direction at an equal interval. Each of the n pieces of scanning lines 244 is electrically connected to a gate of the corresponding one of the plurality of transistors 24. The n pieces of scanning lines 244 are electrically connected to the scanning line drive circuit 11 illustrated in FIG. 3. Scanning signals G1, G2, . . . , and Gn are line-sequentially supplied from the scanning line drive circuit 11 to the first scanning line 244 to the n-th scanning line 244.

Each of the m pieces of signal lines 246 illustrated in FIG. 4 extends in the Y2 direction, and the m pieces of signal lines 246 are aligned in the X1 direction at an equal interval. Each of the m pieces of signal lines 246 is electrically connected to a source of the corresponding one of the plurality of transistors 24. The m pieces of signal lines 246 are electrically connected to the signal line driving circuit 12 illustrated in FIG. 3. Image signals S1, S2, . . . , and Sm are supplied in parallel from the signal line driving circuit 12 to the first signal line 246 to the m-th signal line 246.

The n pieces of scanning lines 244 and the m pieces of signal lines 246 that are illustrated in FIG. 4 are electrically insulated from one another and are formed in a lattice-like pattern in a plan view. A region surrounded by two adjacent scanning lines 244 and two adjacent signal lines 246 corresponds to the pixel P.

Each of the n pieces of constant potential lines 245 extends in the X1 direction, and the n pieces of constant potential lines 245 are aligned in the Y2 direction at an equal interval. Further, the n pieces of constant potential lines 245 are electrically insulated from the m pieces of signal lines 246 and the n pieces of scanning lines 244, and are arranged away from those lines at an interval. A fixed potential such as a ground potential is applied to each of the constant potential lines 245. The n pieces of constant potential lines 245 are electrically connected to corresponding storage capacitors 241. The storage capacitor 241 is a capacitance element for retaining a potential of the pixel electrode 23.

The scanning signals G1, G2, . . . , and Gn become sequentially active, and the n pieces of scanning lines 244 are sequentially selected. Then, the transistor 24 connected to the selected scanning line 244 is turned to be in an on-state. Then, the image signals S1, S2, . . . , and Sm having magnitudes commensurate with the grayscale to be displayed are transmitted, via the m pieces of signal lines 246, to the pixel P corresponding to the selected scanning line 244, and are then applied to the pixel electrodes 23. With this, a voltage in accordance with the grayscale to be displayed to is applied to a liquid crystal capacitor formed between the pixel electrode 23 and a counter electrode 33 of the counter substrate 3, which is described later, and the alignment of the liquid crystal molecules changes in accordance with the applied voltage. Further, a voltage to be applied is retained by the storage capacitor 241. Such a variation in the alignment of the liquid crystal molecules causes the light LL to be modulated, to thus enable grayscale display.

2Ac. Configuration of Display Panel 1

Figure 5:
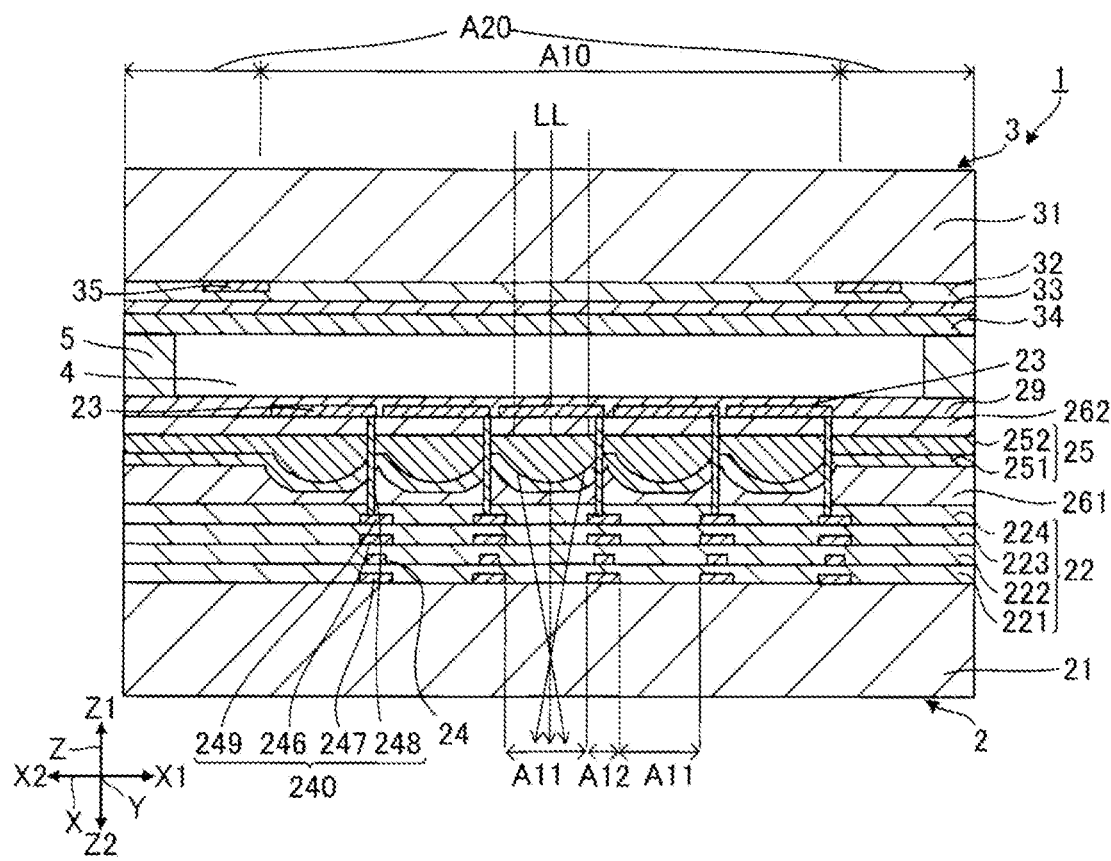
FIG. 5 is a cross-sectional view illustrating a schematic configuration of a display panel illustrated in FIG. 2.
Figure 6:
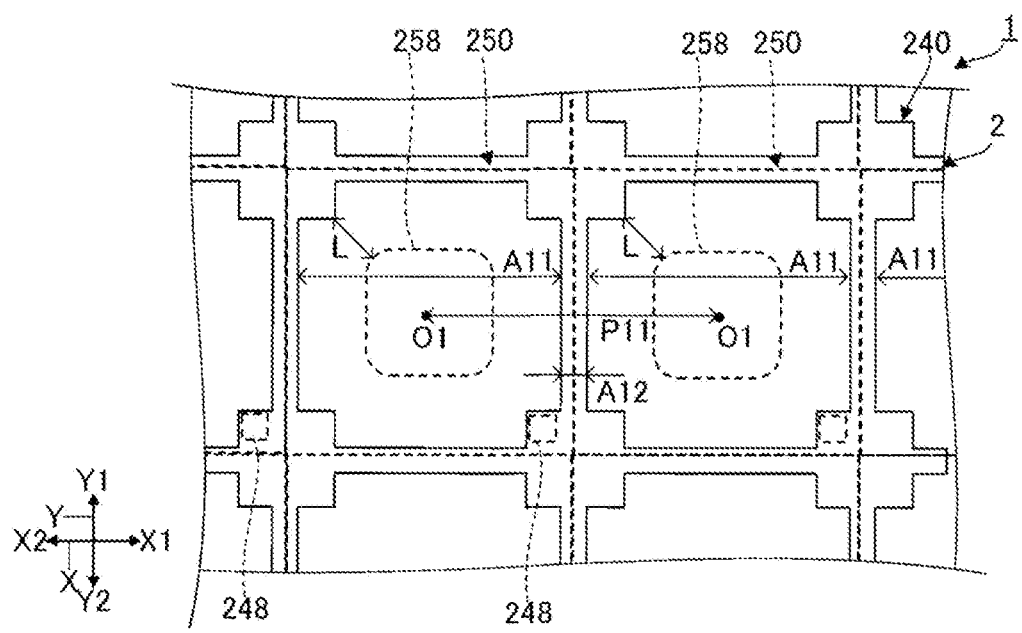
FIG. 6 is a plan view schematically illustrating part of the element substrate illustrated in FIG. 5.

FIG. 5 is a cross-sectional view illustrating a schematic configuration of the display panel 1 illustrated in FIG. 2. FIG. 6 is a plan view schematically illustrating part of the element substrate 2 illustrated in FIG. 5.

As illustrated in FIG. 5, the display region A10 of the display panel 1 includes a plurality of light transmission regions A11 and a light shielding region A12. Each of the light transmission regions A11 is a region through which light LL passes. As illustrated in FIG. 6, the plurality of light transmission regions A11 are away from one another, and are arranged in a matrix pattern in plan view. The light shielding region A12 is a region in a lattice-like pattern surrounding the plurality of light transmission regions A11 in plan view.

2Ac-1. Element Substrate 2

As illustrated in FIG. 5, the element substrate 2 includes a first substrate 21, a laminated body 22, a light transmission layer 261, a lens layer 25, an insulating layer 262, the plurality of pixel electrodes 23, and a first alignment film 29. The first substrate 21, the laminated body 22, the light transmission layer 261, the lens layer 25, the insulating layer 262, the plurality of pixel electrodes 23, and the first alignment film 29 are layered in the Z1 direction in the stated order. Note that, as described above, the plurality of pixel electrodes 23 are given as an example of a "plurality of electrodes". Further, the laminated body 22 is provided with the plurality of transistors 24 and light shielding portions 240 having a light shielding property. In the following description, "light shielding property" refers to a light shielding property to visible light, and indicates that a transmittance of visible light is equal to or less than 50%, preferably, equal to or less than 10%.

The first substrate 21 is a flat plate having a transmissive property and an insulating property. The first substrate 21 is formed of glass or quartz, for example. In the example illustrated in FIG. 4, the laminated body 22 includes insulating films 221, 222, 223, and 224. The insulating films 221, 222, 223, and 224 are arranged toward the pixel electrode 23 in the stated order. Each of the insulating films 221, 222, 223, and 224 is a silicon oxide film formed by thermal oxidation, a chemical vapor deposition (CVD) method, or the like.

The plurality of transistors 24 and the light shielding portions 240 are arranged between the first substrate 21 and the plurality of pixel electrodes 23. Specifically, the plurality of transistors 24 and the light shielding portions 240 are arranged between the films of the laminated body 22. Note that, in FIG. 5, the transistor 24 and the light shielding portion 240 are illustrated in schematic manner. For example, the transistor 24 includes a semiconductor layer having a Lightly Doped Drain (LDD) structure, a gate insulating layer, and a gate electrode.

The light shielding portion 240 is aggregate of films having a light shielding property, including the plurality of storage capacitors 241 illustrated in FIG. 3 described above, the plurality of scanning lines 244, the plurality of signal lines 246, and the like. In FIG. 5, the plurality of signal lines 246 are representatively illustrated. Further, the light shielding portion 240 includes a plurality of relay electrodes 249, a plurality of light shielding films 247, and a plurality of contacts 248. Each of the relay electrodes 249 is electrically connected to the drain of the transistor 24. Each of the light shielding films 247 is provided so as to prevent light from entering the transistor 24 from the Z1 direction. Further, the plurality of contacts 248 are connected to the plurality of pixel electrodes 23 in a one-on-one manner. The contact 248 connects the pixel electrode 23 and the relay electrode 249 to each other.

Further, the light shielding portion 240 is arranged in the light shielding region A12 in a lattice-like pattern surrounding the plurality of light transmission regions A11 in plan view. As illustrated in FIG. 6, the shape of the light shielding portion 240 in plan view is a frame-like shape surrounding the plurality of light transmission regions A11. Note that the contact 248 of the light shielding portion 240 is arranged in the light shielding region A12, but part of the contact 248 may be positioned in the light transmission region A11.

Further, the contact 248 may be a region overlapping with the scanning line 244 or a region overlapping with the signal line 246 in plan view.

The storage capacitor 241, the scanning line 244, the signal line 246, the contact 248, and the like of the light shielding portion 240 are formed by using metal such as tungsten (W), titanium (Ti), chromium (Cr), iron (Fe), and aluminum (Al), metal silicide, or a metal compound.

As illustrated in FIG. 5, the light transmission layer 261 is arranged at the laminated body 22. The light transmission layer 261 has an insulating property and a transmissive property. The lens layer 25 is arranged at the light transmission layer 261. The lens layer 25 has a transmissive property and an insulating property, and condenses the light LL. The insulating layer 262 is arrange on the lens layer 25. The insulating layer 262 has a transmissive property and an insulating property. For example, the insulating layer 262 is provided so as to stabilize properties of the lens layer 25. Note that the insulating layer 262 may be omitted. The light transmission layer 261 and the lens layer 25 are described later in detail.

The plurality of pixel electrodes 23 are arranged at the insulating layer 262. The plurality of pixel electrodes 23 are arranged correspondingly to the plurality of light transmission regions A11. The pixel electrode 23 is arranged in the light transmission region A11 in a one-on-one manner. Each of the pixel electrodes 23 is used to apply an electric field to the liquid crystal layer 5. Each of the pixel electrodes 23 is formed of a transparent electrode material such as Indium Tin Oxide (ITO) or Indium Zinc Oxide (IZO). The plurality of pixel electrodes 23 are arranged in a matrix pattern in plan view.

The first alignment film 29 is arranged so as to cover the plurality of pixel electrodes 23. The first alignment film 29 is a film for aligning the liquid crystal molecules. Examples of the material of the first alignment film 29 include polyimide and silicon oxide.

2Ac-2. Counter Substrate 3

As illustrated in FIG. 5, the counter substrate 3 includes a second substrate 31, an inorganic insulating film 32, a counter electrode 33, a second alignment film 34, and a partition portion 35. The second substrate 31, the inorganic insulating film 32, the counter electrode 33, and the second alignment film 34 are laminated in the Z2 direction in the stated order.

The second substrate 31 is a flat plate having a transmissive property and an insulating property. The second substrate 31 is formed of glass or quartz, for example. The liquid crystal layer 5 is arranged between the second substrate 31 and the first substrate 21 described above. Further, the inorganic insulating film 32 has a transmissive property and an insulating property. The inorganic insulating film 32 is formed of an inorganic material including silicon such as silicon oxide.

The partition portion 35 having a light shielding property is arranged at the inorganic insulating film 32. The partition portion 35 is arranged in the peripheral region A20 illustrated in FIG. 3 so as to surround the plurality of pixel electrodes 23 in plan view. The shape of the partition portion 35 in plan view is a frame-like shape. The partition portion 35 is provided to block part of the light LL that may enter the display region A10. The partition portion 35 is formed of metal such as tungsten, chromium, and aluminum, metal silicide, or a metal compound.

The counter electrode 33 is a common electrode arranged with respect to the plurality of pixel electrodes 23 via the liquid crystal layer 5. The counter electrode 33 is used to apply an electric field to the liquid crystal layer 5. The counter electrode 33 is provided in common for the plurality of pixels P. The counter electrode 33 is formed of a transparent electrode material such as ITO and IZO. Further, the second alignment film 34 is a film for aligning the liquid crystal molecules in the liquid crystal layer 5. Examples of the material of the second alignment film 34 include polyimide and silicon oxide.

For the counter substrate 3 described above, a light shielding member having a light shielding property and a lens member for refracting the light LL are not arranged in the display region A10.

2Ad. Light Transmission Layer 261 and Lens Layer 25

Figure 7:
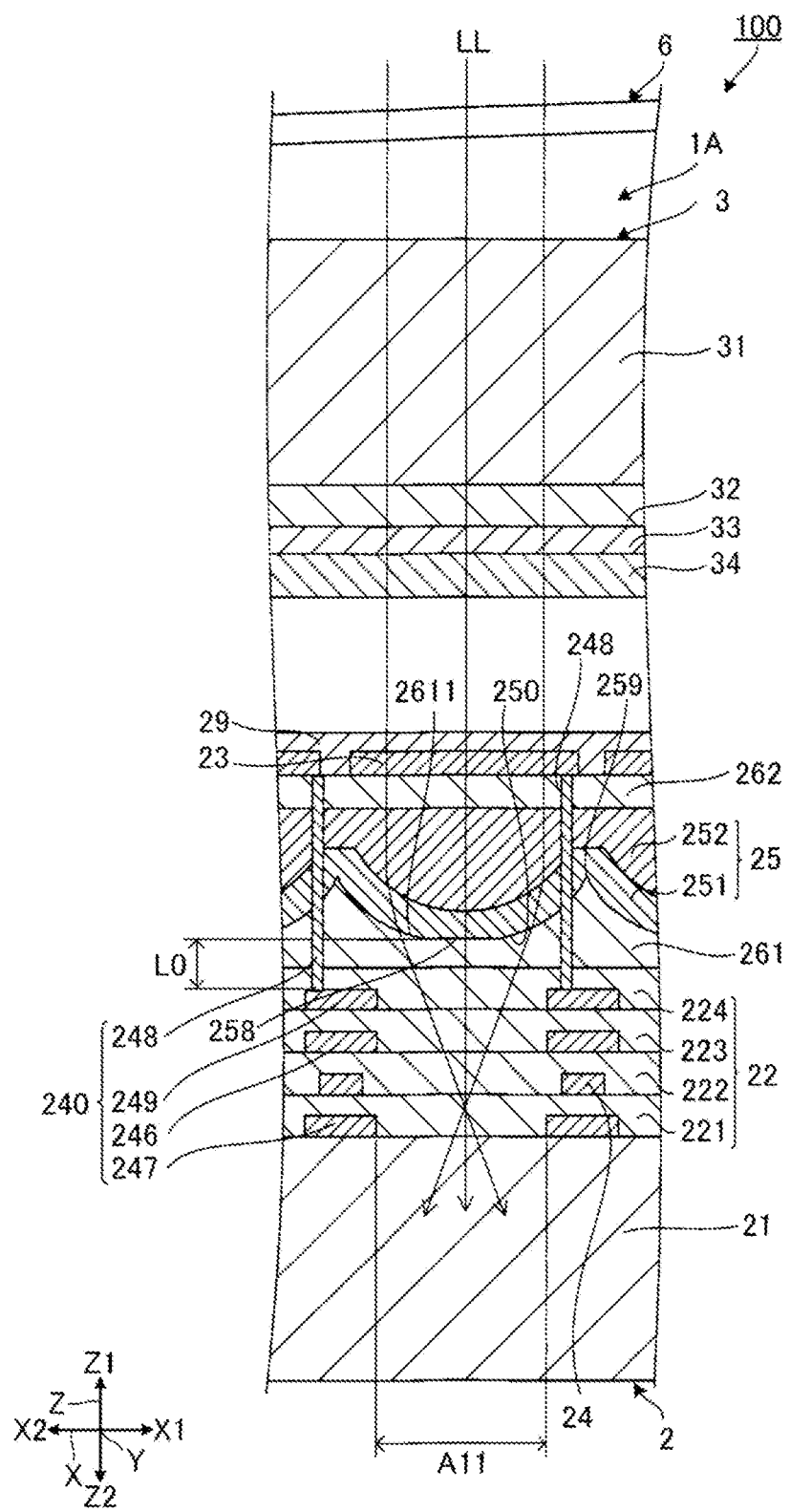
FIG. 7 is a view illustrating part of the display panel illustrated in FIG. 5.

FIG. 7 is a view illustrating part of the display panel 1 illustrated in FIG. 4. Now, the light transmission layer 261 and the lens layer 25 are described below in detail.

As illustrated in FIG. 7, the light transmission layer 261 includes a plurality of concave surfaces 2611 having a curved shape. One concave surface 2611 is provided for the light transmission region A11. The light transmission layer 261 has an effect of adjusting a focal position of a light beam emitted from the lens layer 25 in the Z2 direction. The material of the light transmission layer 261 is an inorganic material including silicon such as silicon oxide, silicon oxynitride, and silicon nitride.

The lens layer 25 is arranged at the light transmission layer 261 so as to fill inner spaces of the plurality of concave surfaces 2611. The lens layer 25 is formed of an inorganic material including silicon such as silicon oxynitride. A refractive index of the lens layer 25 is different from a refractive index of the light transmission layer 261. In the present exemplary embodiment, the refractive index of the lens layer 25 is greater than the refractive index of the light transmission layer 261.

The lens layer 25 includes a plurality of lenses 250 arranged correspondingly to the plurality of light transmission regions A11. The plurality of lenses 250 include lens surfaces. The lens surface is a convex surface having a curved shape that is brought into contact with the concave surface 2611 of the light transmission layer 261. Each of the lenses 250 protrudes from the insulating layer 262 in the Z2 direction. The lens 250 is provided for the light transmission region A11. The lens 250 refracts and condenses the light LL, and thus the light LL can be prevented from entering the transistor 24.

Further, the lens layer 25 includes a first layer 251 and a second layer 252. A first layer 251A and a second layer 252A contact with each other. The first layer 251 is arranged between the light transmission layer 261 and the second layer 252, and is brought into contact with the light transmission layer 261 and the second layer 252. The first layer 251 is formed in conformity with the shape of the concave surface 2611 of the light transmission layer 261. The second layer 252 is arranged on a side opposite to the light transmission layer 261 with respect to the first layer 251. In the present exemplary embodiment, the second layer 252 is arranged between the first layer 251 and the plurality of pixel electrodes 23. The second layer 252 fills part of the inner region of the concave surface 2611 other than the first layer 251. Further, a refractive index of the first layer 251 and a refractive index of the second layer 252 are different from each other. In the present exemplary embodiment, the refractive index of the second layer 252 is greater than the first layer 251. Note that the refractive index of the second layer 252 may be less than the refractive index of the first layer 251.

The insulating layer 262 is arranged between the lens layer 25 and the plurality of pixel electrodes 23. The material of the insulating layer 262 is an inorganic material including silicon such as silicon oxide and silicon oxynitride. Note that the insulating layer 262 may include a film formed of an inorganic material such as Borosilicate Glass (BSG) having a transmissive property and a hygroscopic property.

Here, as described above, the light LL entering the electro-optical device 100 through the second substrate 31 is emitted through the first substrate 21. Further, the electro-optical device 100 includes the phase difference compensation plate 6 that is arranged on the side opposite to the first substrate 21 with respect to the liquid crystal layer 5 and compensates a phase difference of the light LL in the liquid crystal layer 5. The phase difference compensation plate 6 is provided. With this, before the light LL enters the liquid crystal layer 5, the light LL enters the phase difference compensation plate 6, and a phase shift due to pre-tilting in the liquid crystal layer 5 can be compensated. Thus, visual field angle dependency can be suppressed, and degradation of contrast in a direction in a wide range including a front direction can be suppressed.

Further, in the display region A10, alight shielding member having a light shielding property is not provided between the liquid crystal layer 5 and the phase difference compensation plate 6. This means that a light shielding member is not arranged in the display region A10 at the counter substrate 3. Thus, there is no risk in that dispersion or diffraction is caused by the light shielding member before the light LL passing through the phase difference compensation plate 6 enters the liquid crystal layer 5. Therefore, an effect obtained by using the phase difference compensation plate 6 can be exerted suitably, and degradation of contrast can be suppressed.

Further, in the display region A10, a lens member is not provided between the liquid crystal layer 5 and the phase difference compensation plate 6. Specifically, a lens member is not arranged in the display region A10 at the counter substrate 3. Thus, there is no risk in that the lens member condenses, in the liquid crystal layer 5, the light LL passing through the phase difference compensation plate 6. Therefore, deterioration of the liquid crystal layer 5 due to light condensation is suppressed, and hence there is no risk in that light-fast duration is shortened due to light condensation. In particular, when, in a projector with a high luminous flux, a lens member arranged on the incident side of the light LL with respect to the liquid crystal layer 5 condenses the light LL entering the liquid crystal layer 5, there may be a risk that light-fast duration is affected disadvantageously. Therefore, it is particularly advantageous to use the electro-optical device 100 including the counter substrate 3 without a lens member in a projector.

Further, the counter substrate 3 does not include a lens member and a light shielding member in the display region A10. Thus, as compared to a case in which the counter substrate 3 includes those members, a combination shift between the element substrate 2 and the counter substrate 3 is less likely to happen. Further, the element substrate 2 is provided with both the lens layer 25 and the light shielding portion 240, and hence a position shift between the lens layer 25 and the light shielding portion 240 is less likely to happen.

Further, the electro-optical device 100 includes the lens layer 25 arranged between the liquid crystal layer 5 and the first substrate 21. Thus, the lens layer 25 can condenses the light LL passing through the liquid crystal layer 5. Further, the lens layer 25 includes the first layer 251 and the second layer 252 having a refractive index that is different from the refractive index of the first layer. Thus, as compared to a case in which the lens layer 25 is formed of one layer, lens power can be finely adjusted. Thus, there can be suppressed a risk in that the light LL enters the light shielding portion 240, and an amount of light passing through the first substrate 21 can be increased. At the same time, a large amount of light can be caused to enter a projection lens included in the projection optical system 4004. As a result, a brighter image can be obtained.

Based on those matters, with the electro-optical device 100, an image brighter than that in the related art can also be displayed while suppressing degradation of contrast and degradation of light-fast duration. Thus, the electro-optical device 100 with excellent display quality can be provided.

Figure 8:
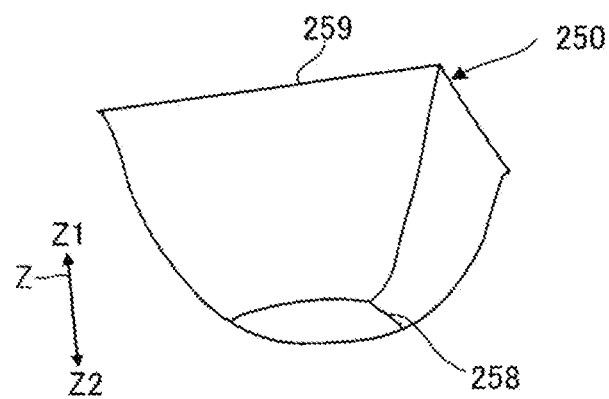
FIG. 8 is a perspective view of a lens illustrated in FIG. 7.
Figure 9:
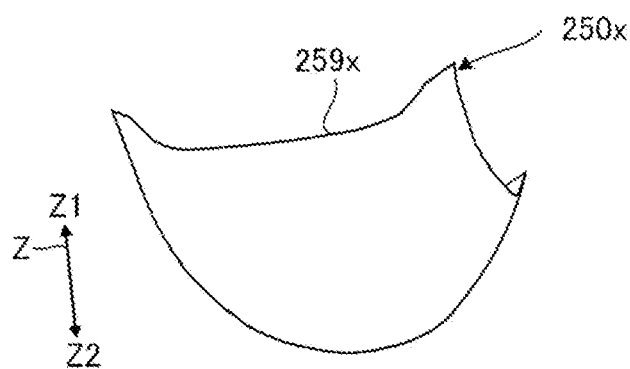
FIG. 9 is a perspective view of a lens in a reference example.

FIG. 8 is a perspective view of the lens 250 illustrated in FIG. 7. FIG. 8 is a view illustrating one lens 250 among the plurality of lenses 250. FIG. 9 is a perspective view of a lens 250$x$ in a reference example.

As illustrated in FIG. 8, the lens 250 has a top surface 258 having a flat shape. Therefore, each of the plurality of lenses 250 includes the top surface 258 having a flat shape. As illustrated in FIG. 7, the top surface 258 is parallel to an X-Y plane. The top surface 258 is parallel to the surface of the pixel electrode 23. As illustrated in FIG. 6, the top surface 258 is positioned at the center portion of the lens 250 in plan view.

In contrast, as illustrated in FIG. 9, the lens 250$x$ does not include the top surface 258 having a flat shape. When the curvature of the lens 250$x$ is excessively large, usage of the light LL passing through the electro-optical device 100 is difficult in some cases. For example, when the curvature of the lens 250$x$ is excessively large, there is a risk in that part of the light LL passing through the electro-optical device 100 may not enter the projection lens included in the projection optical system 4004 illustrated in FIG. 1. Thus, the top surface 258 positioned at the center portion of the plurality of lenses 250 is preferably flat. Note that the lens 250 is not required to have the top surface 258 having a flat shape.

Further, as illustrated in FIG. 6, the top surface 258 is present in the light transmission region A11 in plan view. Further, a shortest distance L between the edge of the top surface 258 and the edge of the light shielding portion 240 in plan view preferably satisfies Expression (1) given below.

$$L > L0 \times \tan\theta + x \quad (1)$$

$x$ in Expression (1) is a position shift error between the plurality of lenses 250 and the light shielding portion 240 in plan view. Specifically, $x$ is an error in manufacturing between the lens layer 25 and the light shielding portion 240. As illustrated in FIG. 7, L0 is a distance between the top surface 258 of the lens 250 and the relay electrode 249 of the light shielding portion 240, which is positioned at the position closest to the lens 250. Further, θ in Expression (1) is a maximum value of an incident angle to the display panel 1 with respect to the optical axis of the light LL.

When Expression (1) is satisfied, degradation of contrast can be suppressed as compared to a case in which the expression is not satisfied. Further, when the electro-optical device 100 is used in a projector, vignetting of the projection lens included in the projection optical system 4004 illustrated in FIG. 1 can be suppressed. Note that the shortest distance L is not required to satisfy Expression (1) given above.

Further, as illustrated in FIG. 8, a ridge 259 of the lens 250 has a linear shape. Therefore, the ridge 259 of each of the plurality of lenses 250 has a linear shape. The ridge 259 is a boundary between the plurality of lenses 250, and is a valley part of each of the lenses 250. Meanwhile, as illustrated in FIG. 9, a ridge 259$x$ of the lens 250$x$ has a curved shape.

As illustrated in FIG. 8, the plurality of lenses 250 are away from each other so that the ridge 259 of each of the lenses 250 has a linear shape. With this, the area of the lens surface of the lens 250 illustrated in FIG. 8 can be increased more than the area of the lens surface of the lens 250$x$ illustrated in FIG. 9. Thus, the amount of the light LL passing through the electro-optical device 100 can be increased while reducing the light LL entering the light shielding portion 240.

Figure 10:
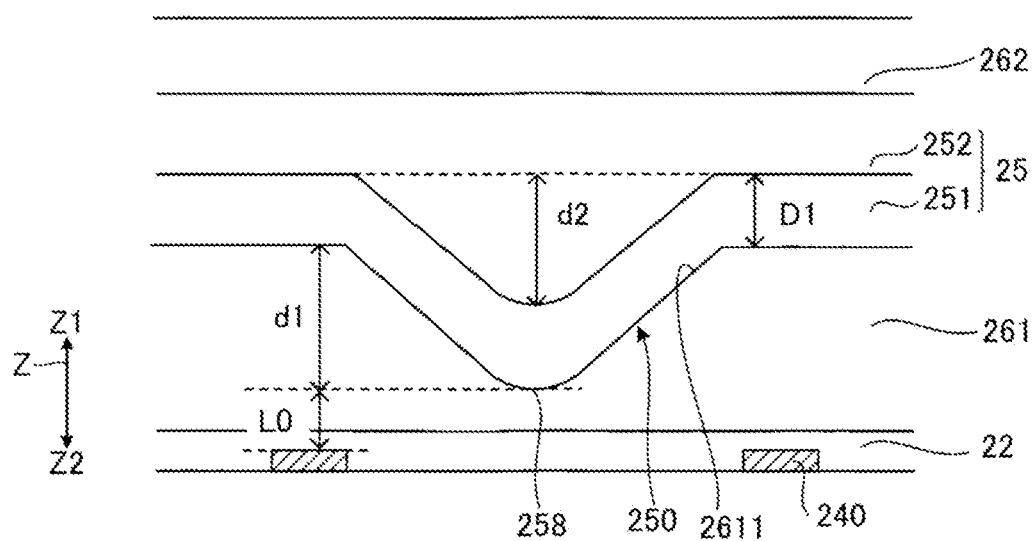
FIG. 10 is a view schematically illustrating a light transmission layer and a lens layer illustrated in FIG. 7.

FIG. 10 is a view schematically illustrating the light transmission layer 261 and the lens layer 25 illustrated in FIG. 7. As described above, the refractive index n2 of the second layer 252 illustrated in FIG. 10 is greater than the refractive index n1 of the first layer 251. Thus, as compared to a case in which the refractive index n2 is equal to or less than the refractive index n1, the amount of the light LL passing through the electro-optical device 100 can be increased. Specifically, a transmittance of the electro-optical device 100 can be enhanced. Thus, a brighter image can be displayed.

Further, the refractive index n0 of the light transmission layer 261, the refractive index n1 of the first layer 251, and the refractive index n2 of the second layer 252 decrease in the stated order. Specifically, a relationship of n0<n1<n2 is satisfied, where n0 is the refractive index of the light transmission layer 261, n1 is the refractive index of the first layer 251, and n2 is the refractive index of the second layer 252. When the relationship of n0<n1<n2 is satisfied, a transmittance of the electro-optical device 100 can be enhanced as compared to a case in which the relationship is not satisfied.

Figure 11:
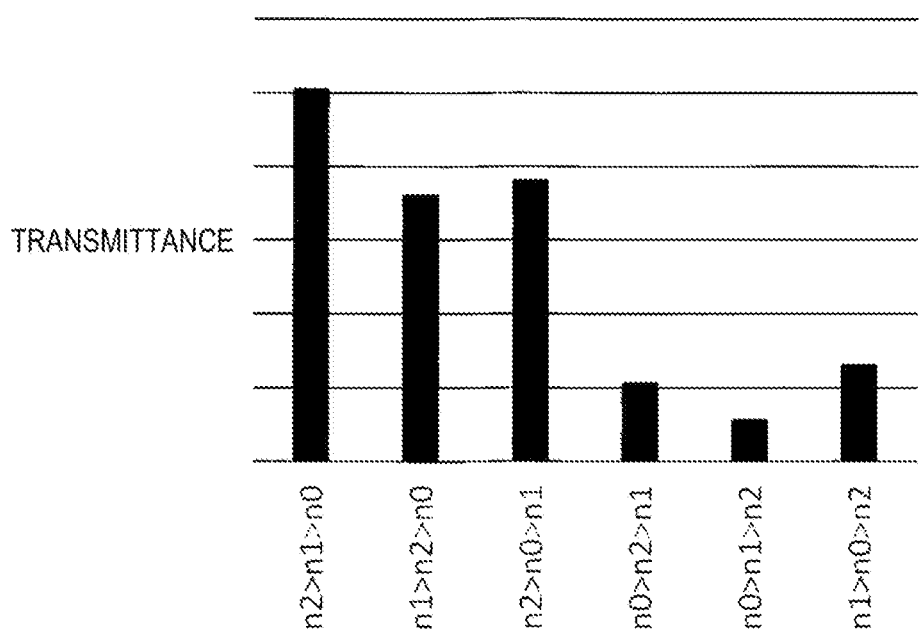
FIG. 11 is a graph showing a relationship between a transmittance and a refractive index of each of the light transmission layer and the lens layer illustrated in FIG. 10.

FIG. 11 is a graph showing a relationship between the transmittance and the refractive index of each of the light transmission layer 261 and the lens layer 25 illustrated in FIG. 10. The transmittance of each of the light transmission layer 261 and the lens layer 25 is greater at the upper side of the vertical axis of the graph.

As illustrated in FIG. 11, the refractive indexes n0, n1, and n2 satisfy the relationship of n0<n1<n2, the highest transmittance is obtained. Therefore, when the relationship of n0<n1<n2 is satisfied, a brighter image can be displayed as compared to a case in which the relationship is not satisfied.

Note that the refractive indexes n0, n1, and n2 are not required to satisfy the relationship of n0<n1<n2. For example, the refractive indexes n0, n1, and n2 may satisfy a relationship of n0<n2<n1.

Further, the material of the lens layer 25 is preferably silicon oxynitride (SiON). Thus, the material of each of the first layer 251 and the second layer 252 is preferably silicon oxynitride. When silicon oxynitride is used, the lens layer 25 can be formed at a low temperature. Thus, the lens layer 25 having a high refractive index can be achieved easily. Further, when silicon oxynitride is used, a content ratio of oxygen and nitrogen is adjusted. With this, the refractive index n1 of the first layer 251 and the refractive index n2 of the second layer 252 can be different from each other easily.

Moreover, the material of the light transmission layer 261 is preferably silicon oxynitride or silicon oxide, more preferably, silicon oxide. When silicon oxynitride is used, a content ratio of oxygen and nitrogen is adjusted. With this, the refractive index n1 of the first layer 251, the refractive index n2 of the second layer 252, and the refractive index n0 of the light transmission layer 261 can be different from one another easily. Further, when the material of the light transmission layer 261 is silicon oxide, the refractive index n0 of the light transmission layer 261 can particularly be less than the refractive index n1 of the first layer 251 and the refractive index n2 of the second layer 252 easily.

Note that the material of each of the lens layer 25 and the light transmission layer 261 may be aluminum oxide, a resin material, or the like.

Further, the contact 248 that connects the pixel electrode 23 and the relay electrode 249 to each other as described above preferably has a columnar shape filling a contact hole being a through hole formed in the laminated body 22. As compared to a case in which the contact has a so-called trench-like shape formed along a wall surface of the contact hole, each arrangement space for the contact portion having a columnar shape can be reduced. Therefore, reduction in aperture rate, that is, reduction in area of the light transmission region A11 can be suppressed. Note that the contact 248 may have a trench-like shape, for example. Further, the contact 248 preferably contains tungsten. When tungsten is contained, the contact portion having a columnar shape with high definition can be formed easily.

Further, the distance L0 between the light shielding portion 240 and the top surface 258 illustrated in FIG. 10 is preferably equal to or less than 60% of a pitch P11 of the plurality of light transmission regions A11 illustrated in FIG. 6. The pitch P11 is a distance between centers O1 of two lenses 250 adjacent to each other in the X1 direction or the Y1 direction.

Figure 12:
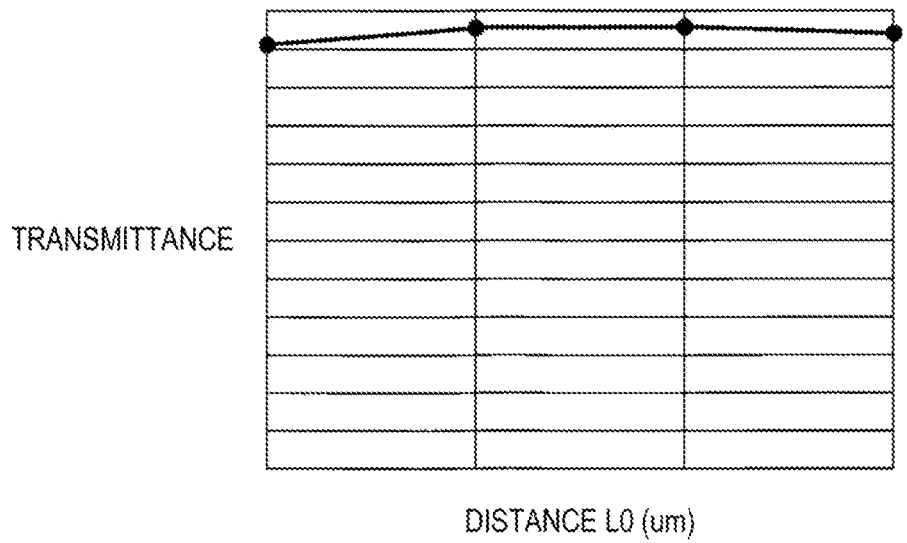
FIG. 12 is a graph showing a relationship between a transmittance and a distance between a light shielding portion and a top surface illustrated in FIG. 10.

FIG. 12 is a graph showing a relationship between the transmittance and the distance L0 between the light shielding portion 240 and the top surface 258 in FIG. 10. The distance L0 is larger toward the right side along the horizontal axis of the graph, and is inclined to saturation. Further, the horizontal axis illustrated in FIG. 12 indicates a range corresponding to the distance L0 that is equal to or greater than 56% and equal to or less than 70% of the pitch P11. The transmittance of each of the light transmission layer 261 and the lens layer 25 is greater at the upper side of the vertical axis of the graph.

As illustrated in FIG. 12, within the range corresponding to the distance L0 that is equal to or greater than 56% and equal to or less than 70% of the pitch P11, there is hardly any reduction in transmittance. Thus, even when the distance L0 is increased, there is hardly any degradation of a transmissive property. However, as the distance L0 is increased in thickness, formation of the contact 248 is more difficult. Therefore, in order to facilitate formation of the contact 248, the distance L0 is preferably prevented from being excessively increased. Specifically, as described above, the distance L0 is preferably equal to or less than 60% of the pitch P11. When the distance L0 is equal to or less than 60% of the pitch P11, formation of the contact 248 is facilitated, and the transmittance of each of the light transmission layer 261 and the lens layer 25 can be secured sufficiently, as compared to a case in which the distance L0 exceeds 60% of the pitch P11. Note that, when the distance L0 exceeds 60% of the pitch P11, there is a risk in that formation of the contact hole and filling of the contact 248 in the contact hole for forming the contact 248 may be difficult.

Further, in view of improving a transmittance, the thickness D1 of the first layer 251 is preferably equal to or greater than 30% of the pitch P11.

Further, the thickness D1 of the first layer 251 illustrated in FIG. 10 is preferably twice or less of the pitch P11 of the plurality of light transmission regions A11 illustrated in FIG. 6. Note that the thickness D1 is an average film thickness of the first layer 251.

Figure 13:
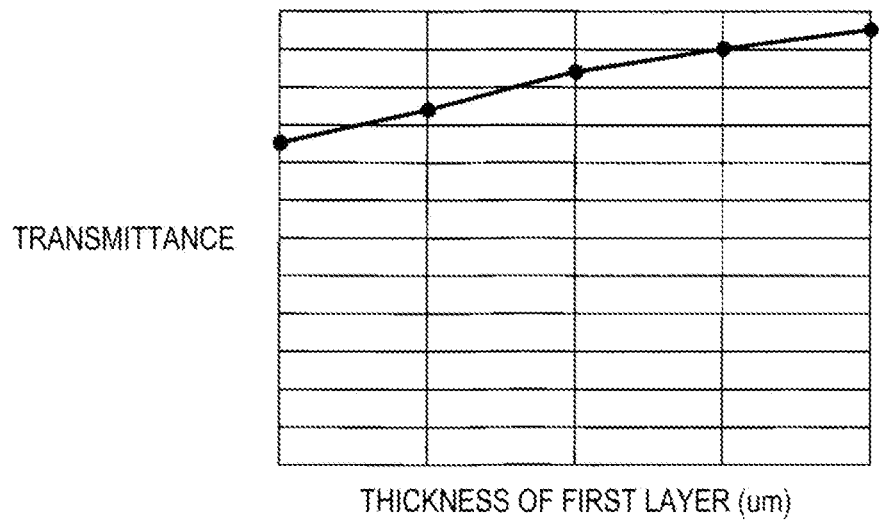
FIG. 13 is a graph showing a relationship between a transmittance and a thickness of a first layer illustrated in FIG. 10.

FIG. 13 is a graph showing a relationship between the transmittance and the thickness D1 of the first layer 251 illustrated in FIG. 10. The thickness D1 is larger toward the right side along the horizontal axis of the graph. The transmittance of each of the light transmission layer 261 and the lens layer 25 is greater at the upper side of the vertical axis of the graph.

As illustrated in FIG. 13, as the thickness D1 of the first layer 251 is increased, the transmittance is higher. However, as the thickness D1 is increased, formation of the contact 248 is more difficult. In view of this, in order to improve a transmittance and facilitate formation of the contact 248, the thickness D1 of the first layer 251 is preferably twice or less of the pitch P11. Further, in view of improving a transmittance, the thickness D1 of the first layer 251 is preferably 1.0 times or greater of the pitch P11.

Further, a depth d1 of the first layer 251 and a depth d2 of the second layer 252 illustrated in FIG. 10 are preferably equal to each other. Note that the expression "equal" indicates that substantial equality, and includes a case in which an error between the depth d1 and the depth d2 is ±5% or less. Further, each of the depth d1 of the first layer and the depth d2 of the second layer 252 is preferably equal to or greater than 30% and equal to or less than 60% of the pitch P11 of the plurality of light transmission regions A11 illustrated in FIG. 6. The depth d1 is a distance between the top surface 258 and the ridge 259 in the Z1 direction. The depth d2 is a length of the second layer 252 in the Z1 direction on the inner side of the concave surface 2611.

Figure 14:
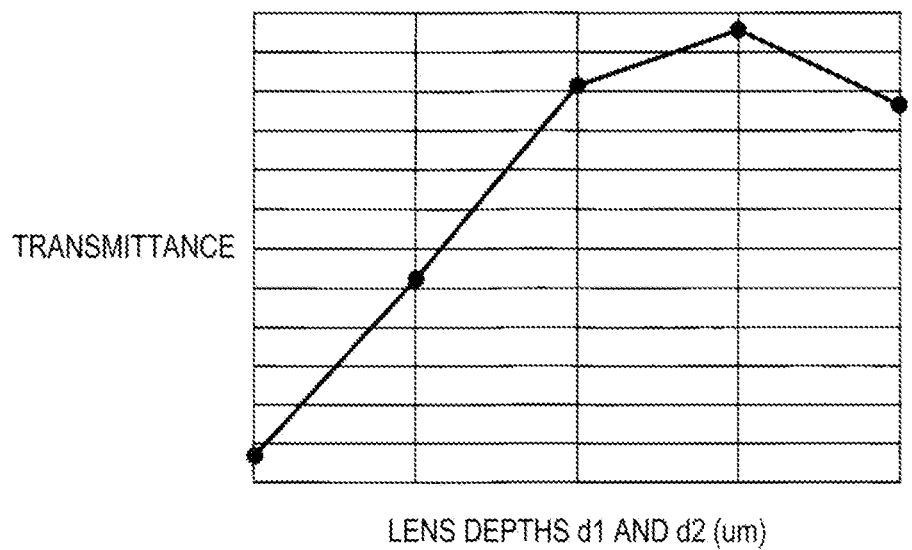
FIG. 14 is a graph showing a relationship between a transmittance and a depth of each of the first layer and a second layer illustrated in FIG. 10.

FIG. 14 is a graph showing a relationship between the transmittance and the depth of each of the first layer 251 and the second layer 252 illustrated in FIG. 10. The horizontal axis of the graph indicates the depth d1 or the depth d2. The depth d1 or the depth d2 is larger toward the right side along the horizontal axis of the graph. The transmittance of each of the light transmission layer 261 and the lens layer 25 is greater at the upper side of the vertical axis of the graph.

As illustrated in FIG. 14, when the depth d1 of the first layer 251 and the depth d2 of the second layer 252 are excessively small, the transmittance is reduced. Further, when the depth d1 of the first layer 251 and the depth d2 of the second layer 252 are excessively large, the transmittance is also reduced. As a result of examining the relationship between the depth d1 and the depth D2 and the transmittance, the depth d1 and the depth D2 are preferably 30% to 60% of the pitch P11 of the plurality of light transmission regions A11 illustrated in FIG. 6. When the depths falls within the range, reduction in transmittance can be suppressed as compared to a case in which the depths are out of the range. Thus, when the depth fall within the range, the transmittance can be improved as compared to a case where the depths are out of the range.

Note that the depth d1 and the depth d2 may be different from each other.

Further, the length of the contact 248 in the Z1 direction is not particularly limited, and is preferably three times or less of the pitch P11 illustrated in FIG. 6. When the length is three times or less thereof, formation of the contact 248 is facilitated as compared to a case in which the length exceeds three times thereof.

2B. Second Exemplary Embodiment

A second exemplary embodiment is described. Note that, a sign used in the description of the first exemplary embodiment is used for the same matter as that of the first exemplary embodiment, and each detailed description thereof is appropriately omitted.

Figure 15:
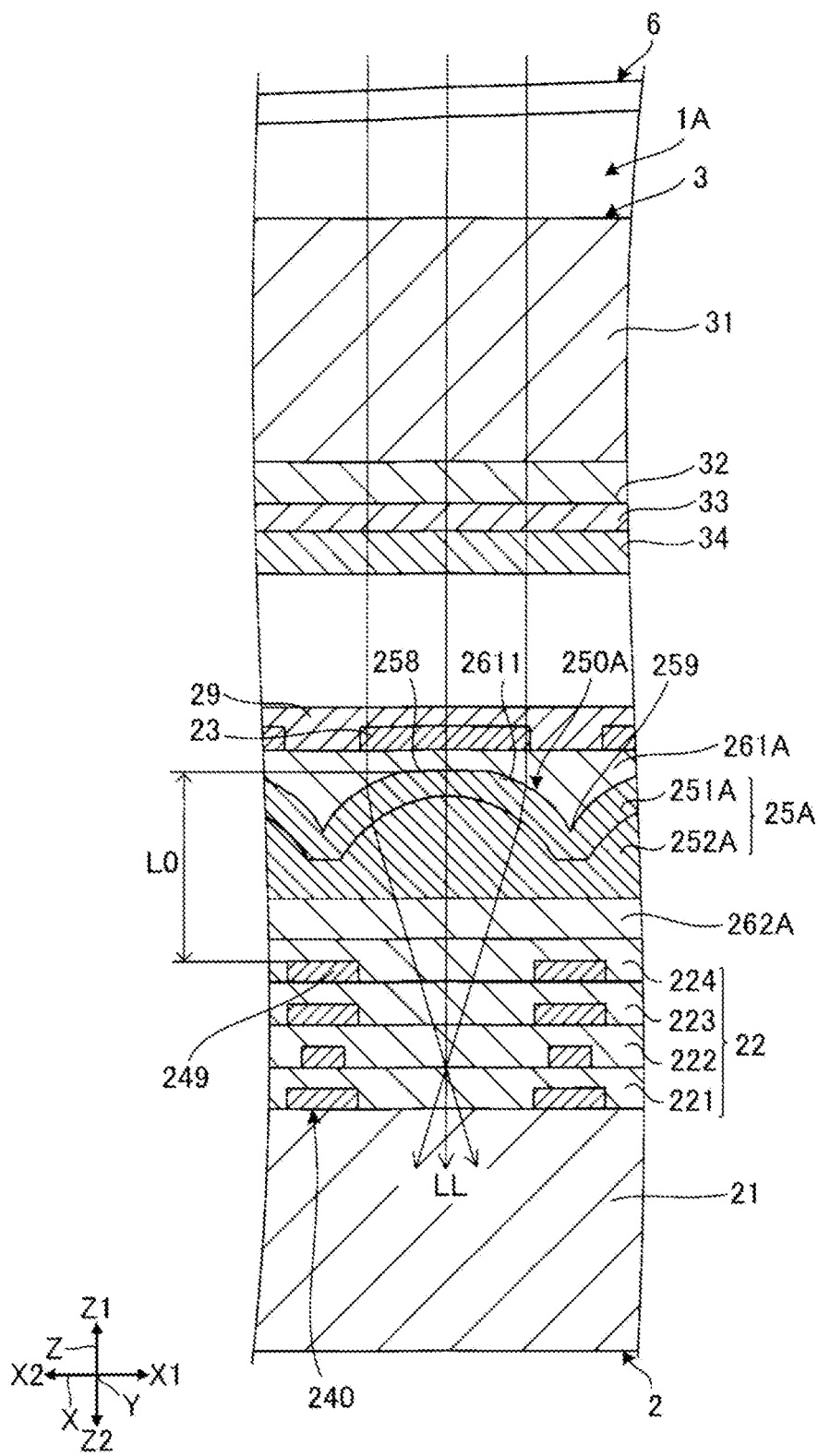
FIG. 15 is a view illustrating part of a display panel according to a second exemplary embodiment.

FIG. 15 is a view illustrating part of a display panel 1A according to the second exemplary embodiment. The display panel 1 of the present exemplary embodiment includes a light transmission layer 261A, a lens layer 25A, and an insulating layer 262A in place of the light transmission layer 261, the lens layer 25, and the insulating layer 262 of the first exemplary embodiment. Note that, in the following description, the light transmission layer 261A, the lens layer 25A, and the insulating layer 262A are described mainly with differences from the light transmission layer 261, the lens layer 25, and the insulating layer 262 of the first exemplary embodiment, and description on similarities therebetween is omitted.

As illustrated in FIG. 15, the insulating layer 262A is arranged at the laminated body 22. The lens layer 25A is arranged at the insulating layer 262A. The light transmission layer 261A is arranged at the lens layer 25A, and is brought into contact with the lens layer 25A. The plurality of pixel electrodes 23 are arranged at the light transmission layer 261A. Therefore, the light shielding portion 240, the insulating layer 262A, the lens layer 25A, the light transmission layer 261A, and the plurality of pixel electrodes 23 are arranged in the Z1 direction in the stated order.

The lens layer 25A includes a plurality of lenses 250A. Each of the lenses 250A protrudes from the insulating layer 262A in the Z1 direction. Further, the lens layer 25A includes the first layer 251A and the second layer 252A. The first layer 251A is arranged between the light transmission layer 261A and the second layer 252A, and is brought into contact with the light transmission layer 261A and the second layer 252A. The second layer 252A is arranged on a side opposite to the light transmission layer 261A with respect to the first layer 251A. In the present exemplary embodiment, the second layer 252A is arranged between the first layer 251A and the light shielding portion 240.

Further, similarly to the first exemplary embodiment, in the present exemplary embodiment, the refractive index n1 of the first layer 251A and the refractive index n2 of the second layer 252 are different from each other. Specifically, the refractive index n2 of the second layer 252A is greater than the refractive index n1 of the first layer 251A. Further, the relationship of n0<n1<n2 is satisfied, where n0 is the refractive index of the light transmission layer 261, n1 is the refractive index of the first layer 251, and n2 is the refractive index of the second layer 252. When the relationship of n0<n1<n2 is satisfied, a transmittance of the electro-optical device 100 can be enhanced as compared to a case in which the relationship is not satisfied.

Further, similarly to the first exemplary embodiment, in the present exemplary embodiment, the material of the lens layer 25A is preferably silicon oxynitride. Further, the material of the light transmission layer 261A is preferably silicon oxynitride or silicon oxide, more preferably, silicon oxide.

Further, similarly to the first exemplary embodiment, in the present exemplary embodiment, the distance L0 between the light shielding portion 240 and the top surface 258 illustrated in FIG. 15 is preferably equal to or less than 60% of the pitch P11 illustrated in FIG. 6. Further, the relationship between the thickness D1 of the first layer 251A and the pitch P11 illustrated in FIG. 6 and the relationship between the depth d1 of the first layer 251A, the depth d2 of the second layer 252A, and the pitch P11 illustrated in FIG. 6 are similar to those in the first exemplary embodiment.

Similarly to the first exemplary embodiment, with the second exemplary embodiment described above, an image brighter than that in the related art can also be displayed while suppressing degradation of contrast and degradation of light-fast duration. Thus, the electro-optical device 100 with excellent display quality can be provided.

2. Modified Example

The exemplary embodiments exemplified above can be variously modified. Specific modification aspects applied to the exemplary embodiments described above are exemplified below. Two or more modes freely selected from exemplifications below can be appropriately used in combination as long as mutual contradiction does not arise.

In each of the exemplary embodiments described above, the phase difference compensation plate 6 is provided separately from the display panel 1.

However, the phase difference compensation plate 6 may be provided in the counter substrate 3, for example. In this case, the phase difference compensation plate 6 is not necessarily required to be inclined with respect to the optical axis of the light LL, and may be perpendicular to the optical axis.

In each of the exemplary embodiments described above, the lens layer 25 or the lens layer 25A has a two-layer structure, but may have a structure with three or more layers.

In the exemplary embodiment described above, the lens layer 25 or 25A is arranged between the light shielding portion 240 and the plurality of pixel electrodes 23. However, in addition to the lens layer 25 or 25A, other lens layers may be arranged between the first substrate 21 and the light shielding film 247. For example, the other lens layers are provided so that the light LL condensed by the lens layer 25 or 25A is made to substantially parallel light and that a large amount of light enters projection lens included in the projection optical system 4004.

In each of the exemplary embodiments described above, the transistor 24 is a TFT, but may be a metal-oxide-semiconductor field-effect transistor (MOSFET).

In each of the exemplary embodiments described above, the electro-optical device 100 employing an active matrix driving system is given as an example. However, the driving system of the electro-optical device 100 is not limited thereto, and a passive matrix system or the like may be employed.

The driving system of the "electro-optical device" is not limited to a vertical electric field system, and may be a horizontal electric field system. In the first exemplary embodiment, the element substrate 2 is provided with the pixel electrode 23, and the counter substrate 3 is provided with the counter electrode 33. Instead, only any one of the element substrate 2 and the counter substrate 3 may be provided with an electrode for applying an electric field to the liquid crystal layer 5. Note that examples of the horizontal electric field system include an In Plane Switching (IPS) mode. Further, in addition to the VA mode, examples of the vertical electric field system include a Twisted Nematic (TN) mode, a PVA mode, and an Optically Compensated Bend (OCB) mode.

3. Other Electronic Apparatuses

Other than the projection-type display apparatus 4000 described above, the electro-optical device 100 is applicable to various electronic apparatuses given below, for example.

Figure 16:
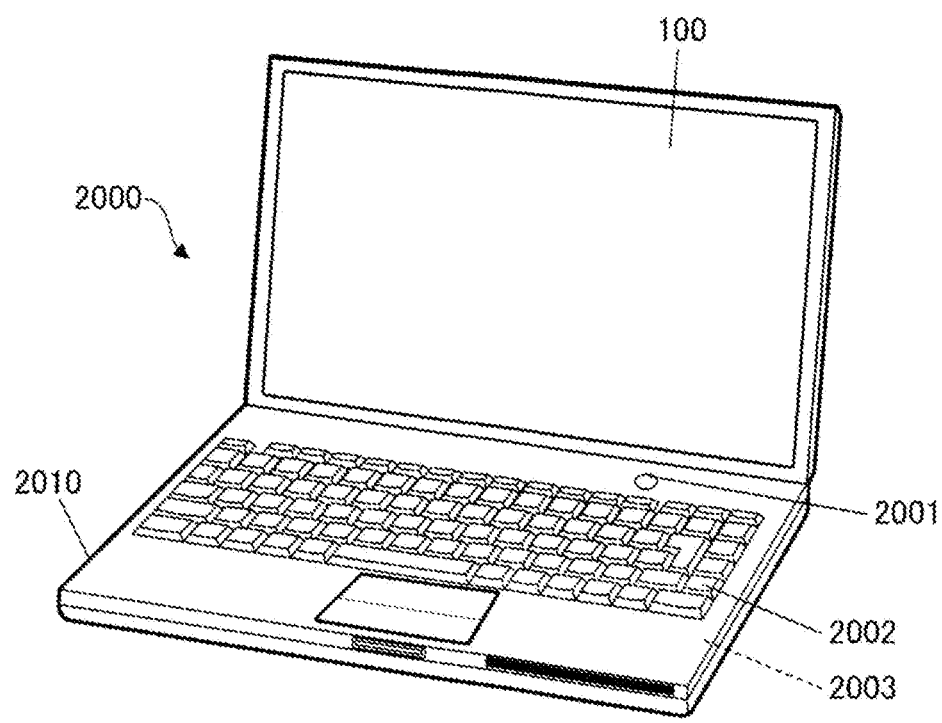
FIG. 16 is a plan view illustrating a smart phone as an example of an electronic apparatus.

FIG. 16 is a perspective view illustrating a personal computer 2000 as an example of an electronic apparatus. The personal computer 2000 includes the electro-optical device 100 that displays various images, a main body unit 2010 in which a power source switch 2001 and a keyboard 2002 are installed, and a control unit 2003. For example, the control unit 2003 includes a processor and a memory, and controls an operation of the electro-optical device 100.

Figure 17:
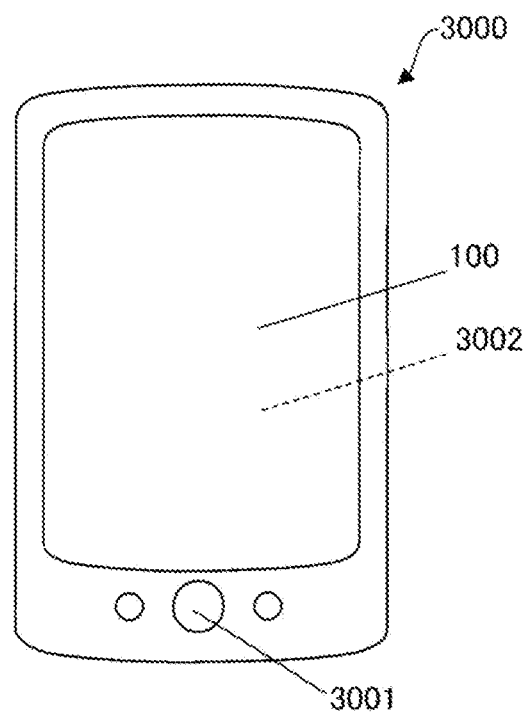
FIG. 17 is a schematic diagram illustrating a projector as one example of an electronic apparatus.

FIG. 17 is a plan view illustrating a smart phone 3000 as an example of an electronic apparatus. The smart phone 3000 includes an operation button 3001, the electro-optical device 100 that displays various images, and a control unit 3002. A display content to be displayed on the electro-optical device 100 is changed in accordance with an operation of the operation button 3001. For example, the control unit 3002 includes a processor and a memory, and controls an operation of the electro-optical device 100.

The electronic apparatuses described above each include the electro-optical device 100 described above and the control unit 2003 or 3002 that controls the electro-optical device 100. Degradation of image quality is suppressed in the electro-optical device 100. Therefore, when the electro-optical device 100 is provided, image quality of the personal computer 2000 or the smart phone 3000 can be improved.

Note that the electronic apparatus to which the electro-optical device according to the present disclosure is applied is not limited to the exemplified apparatuses. Examples of the electronic apparatus include Personal Digital Assistants (PDAs), a digital still camera, a television, a video camera, a car navigation device, a display device for in-vehicle use, an electronic organizer, an electronic paper, an electronic calculator, a word processor, a workstation, a visual telephone, and a Point of sale (POS) terminal. Further, other examples of the electronic apparatus to which the present disclosure is applied include a printer, a scanner, a copier, a video player, and an apparatus including a touch panel.

The present disclosure is described above based on the preferred exemplary embodiments. However, the present disclosure is not limited to the exemplary embodiments described above. In addition, the configuration of each component of the present disclosure may be replaced with any configuration that exerts the equivalent functions of the above-described exemplary embodiments, and to which any configuration may be added.

Further, in the description give above, the liquid crystal device is described as one example of the electro-optical device according to the present disclosure. The electro-optical device according to the present disclosure is not limited thereto. For example, the electro-optical device according to the present disclosure is applicable to, for example, an image sensor.

What is claimed is:
1. An electro-optical device, comprising:
a first substrate;
a second substrate arranged on a light incident side of the first substrate;
a liquid crystal layer arranged between the first substrate and the second substrate;
a pixel electrode arranged between the liquid crystal layer and the first substrate;
a light shielding portion arranged between the pixel electrode and the first substrate;
a light transmission layer having a transmissive property; and
a lens being arranged between the light shielding portion and the pixel electrode and overlapping with the pixel electrode in plan view, the lens including:
a first layer arranged on a side of the light shielding portion; and
a second layer being arranged on a side of the pixel electrode, and having a refractive index different from that of the first layer, wherein
in a display region, a light shielding member having a light shielding property is not arranged between the liquid crystal layer and the second substrate,
the light shielding portion includes a conductive member electrically connected to the pixel electrode,
the first layer has a curved portion where a curved surface is provided,
the conductive member has a columnar shape filling a contact hole passing through the curved portion of the first layer, and
the light transmission layer is in contact with the first layer and has a curved portion corresponding to the curved portion of the first layer.

2. The electro-optical device according to claim 1, wherein
a refractive index of the second layer is greater than a refractive index of the first layer.

3. The electro-optical device according to claim 1, wherein
a material of the lens is silicon oxynitride.

4. The electro-optical device according to claim 1, wherein
a refractive index of the light transmission layer, a refractive index of the first layer, and a refractive index of the second layer decrease in this order.

5. The electro-optical device according to claim 1, wherein
the lens has a top surface having a flat shape.

6. The electro-optical device according to claim 5, wherein
a shortest distance L between an edge of the top surface and an edge of the light shielding portion in plan view satisfies the following Expression (1), $$L > L0 \times \tan\theta + x \quad (1),$$

where x is a position shift error between the lens and the light shielding portion in plan view, θ is a maximum value of an incident angle with respect to an optical axis of the light, and L0 is a distance between the top surface and the light shielding portion.

7. The electro-optical device according to claim 5, wherein
the display region includes a plurality of light transmission regions and a light shielding region in a lattice-like pattern surrounding the plurality of light transmission regions in plan view, and
a distance between the light shielding portion and the top surface is equal to or less than 60% of a pitch of the plurality of light transmission regions.

8. The electro-optical device according to claim 1, wherein the display region includes a plurality of light transmission regions and a light shielding region in a lattice-like pattern surrounding the plurality of light transmission regions in plan view, and a thickness of the first layer is equal to or less than a pitch of the plurality of light transmission regions.

9. The electro-optical device according to claim 1, wherein the display region includes a plurality of light transmission regions and a light shielding region in a lattice-like pattern surrounding the plurality of light transmission regions in plan view, a depth of the first layer and a depth of the second layer are equal to each other, and each of the depth of the first layer and the depth of the second layer is 30% to 60% of a pitch of the plurality of light transmission regions.

10. The electro-optical device according to claim 1, wherein a ridge of the lens has a linear shape.

11. An electronic apparatus, comprising the electro-optical device according to claim 1; and a control unit configured to control an operation of the electro-optical device.

12. The electro-optical device according to claim 1, further comprising a phase difference compensation member arranged on a light incident side of the liquid crystal layer, wherein in the display region, the light shielding member is not arranged between the liquid crystal layer and the phase difference compensation member.

13. An electro-optical device, comprising:

a first substrate;

a second substrate arranged on a light incident side of the first substrate;

a liquid crystal layer arranged between the first substrate and the second substrate;

a pixel electrode arranged between the liquid crystal layer and the first substrate;

a light shielding portion arranged between the pixel electrode and the first substrate;

a phase difference compensation member arranged on a light incident side of the liquid crystal layer; and a lens being arranged between the light shielding portion and the pixel electrode and overlapping with the pixel electrode in plan view, the lens including:

a first layer arranged on a side of the light shielding portion; and a second layer being arranged on a side of the pixel electrode, and having a refractive index different from that of the first layer, wherein in a display region, a light shielding member having a light shielding property is not arranged between the liquid crystal layer and the phase difference compensation member, the lens has a top surface having a flat shape, and a shortest distance L between an edge of the top surface and an edge of the light shielding portion in plan view satisfies the following Expression (1), $$L > L0 \times \tan\theta + x \tag{1},$$

where x is a position shift error between the lens and the light shielding portion in plan view, $\theta$ is a maximum value of an incident angle with respect to an optical axis of the light, and L0 is a distance between the top surface and the light shielding portion.

* * * * *